(12) United States Patent
Hsieh (10) Patent No.: US 9,222,022 B2
(45) Date of Patent: Dec. 29, 2015

(54) POLYMER-STABILIZED OPTICAL ISOTROPIC LIQUID CRYSTAL FORMULATION AND OPTICAL ISOTROPIC LIQUID CRYSTAL DEVICE

(71) Applicant: INDUSTRIAL TECHNOLOGY RESEARCH INSTITUTE, Chutung, Hsinchu (TW)

(72) Inventor: Pao-Ju Hsieh, Hsinchu (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 190 days.

(21) Appl. No.: 13/890,836

(22) Filed: May 9, 2013

(65) Prior Publication Data

US 2013/0341566 A1    Dec. 26, 2013

(30) Foreign Application Priority Data

Jun. 26, 2012 (TW) .............................. 101122744 A (51) Int. Cl.
- C09K 19/52 (2006.01)
- C09K 19/20 (2006.01)
- C09K 19/34 (2006.01)
- C09K 19/54 (2006.01)
- C09K 19/02 (2006.01)
- C09K 19/04 (2006.01)
- C09K 19/12 (2006.01)

(52) U.S. Cl.
CPC ......... *C09K 19/2007* (2013.01); *C09K 19/0275* (2013.01); *C09K 19/542* (2013.01); *C09K 2019/0448* (2013.01); *C09K 2019/122* (2013.01); *C09K 2019/2035* (2013.01); *C09K 2019/2078* (2013.01); *C09K 2019/3408* (2013.01)

(58) Field of Classification Search
CPC ........... C09K 19/0275; C09K 19/2007; C09K 2019/0448; C09K 2019/122; C09K 2019/2078; C09K 2019/3408; C09K 19/542; C09K 2019/2035
See application file for complete search history.

(56) References Cited

U.S. PATENT DOCUMENTS

| 5,087,672 A | 2/1992 | Babirad et al. |
| 5,268,783 A | 12/1993 | Yoshinaga et al. |
| 5,473,450 A | 12/1995 | Yamada et al. |

(Continued)

FOREIGN PATENT DOCUMENTS

| CN | 102220143 A | 10/2011 |
| CN | 102241988 A | 11/2011 |

(Continued)

OTHER PUBLICATIONS

Office Action issued on Aug. 1, 2014 for the corresponding Chinese application No. 201210347754.5.

(Continued)

*Primary Examiner* — Shean C Wu
(74) *Attorney, Agent, or Firm* — Muncy, Geissler, Olds & Lowe, P.C.

(57) ABSTRACT

An embodiment provides a polymer-stabilized optical isotropic liquid crystal formulation, including 50 to 99.5 parts by weight of an optical isotropic liquid crystal material; and 0.5 to 50 parts by weight of polymer, wherein the polymer is polymerized by an acrylic monomer containing fluorine groups and an acrylic monomer with a liquid crystal phase and/or an acrylic monomer without a liquid crystal phase.

16 Claims, 2 Drawing Sheets

(56) References Cited

U.S. PATENT DOCUMENTS

| | | | |
|---|---|---|---|
| 5,477,352 A * | 12/1995 | Hirai et al. | 349/89 |
| 5,674,576 A | 10/1997 | Gotoh et al. | |
| 5,726,728 A * | 3/1998 | Kondo et al. | 349/156 |
| 6,661,400 B2 | 12/2003 | Sakashita | |
| 7,348,953 B1 | 3/2008 | Satake | |
| 7,576,829 B2 | 8/2009 | Kikuchi et al. | |
| 7,722,783 B2 | 5/2010 | Haseba et al. | |
| 7,738,346 B2 * | 6/2010 | Ooi et al. | 369/112.16 |
| 8,372,307 B2 * | 2/2013 | Farrand et al. | 252/299.63 |
| 2009/0291222 A1 | 11/2009 | Qiu et al. | |
| 2009/0322669 A1 | 12/2009 | Bryning et al. | |
| 2010/0103366 A1 | 4/2010 | Farrand et al. | |
| 2010/0225569 A1 | 9/2010 | Park et al. | |
| 2010/0315585 A1 * | 12/2010 | Chien | G02F 1/13718 349/201 |
| 2011/0261306 A1 | 10/2011 | Tsai et al. | |
| 2012/0057086 A1 | 3/2012 | Kizaki et al. | |

FOREIGN PATENT DOCUMENTS

| | | |
|---|---|---|
| CN | 102250624 A | 11/2011 |
| CN | 102486585 A | 6/2012 |
| CN | 103562346 A | 2/2014 |
| CN | 103562347 A | 2/2014 |
| TW | 200907031 | 2/2009 |
| TW | 201116917 | 5/2011 |
| TW | 201130958 | 9/2011 |
| WO | WO 2008/061606 A1 | 5/2008 |
| WO | WO 2012/074081 A1 | 6/2012 |

OTHER PUBLICATIONS

Office Action issued on Jul. 24, 2014 for the corresponding Taiwanese application No. 101122744.

Kikuchi, Hirotsugu et al., Polymer-stablized liquid crystal blue phases, Nature Materials, Sep. 2002, pp. 64-68.

Haseba, Yasuhiro et al., Large Electro-optic Kerr Effect in Nanostructed Chiral Liquid-Crystal Composites over a Wide Temperature Range, Advance Materials, 2005, pp. 2311-2315.

Choi, Suk-Won et al., Optically isotropic-nanostructured liquid crystal composite with high Kerr constant, Applied Physics Letters, 2008, pp. 043119-1-043119-3.

Choi, Suk-Won et al., Optically istropic liquid crystal composite incorporating in-plane electric field geometry, Journal of Physics D: Applied Physics, 2009, pp. 1-5.

Lee, Hyeokjin et al., The World's First Blue Phase Liquid Crystal Display, Digest, 2011, pp. 121-124.

Chen, Kuan-Ming et al., Submillisecond Gray-Level Response Time a Polymer-Stabilized Blue-Phase Liquid Crystal, Journal of Display Technology, Feb. 2010, pp. 49-51.

Chen, Kuan-Ming et al., Hysteresis Effects in Blue-Phase Liquid Crystals, Journal of Display Technology, Aug. 2010, pp. 318-322.

Rao, Linghui et al., Low voltage blue-phase liquid crystal displays, Applied Physics Letters, 2009, pp. 231101-1-231101-3.

Yan, Jin et al., Polymer-stabilized optically isotropic liquid crystals for next-generation display and photonics application, Journal of Materials Chemistry, pp. 7870-7877, 2011.

* cited by examiner

POLYMER-STABILIZED OPTICAL ISOTROPIC LIQUID CRYSTAL FORMULATION AND OPTICAL ISOTROPIC LIQUID CRYSTAL DEVICE

CROSS REFERENCE TO RELATED APPLICATIONS

This application claims priority of Taiwan Patent Application No. 101122744, filed on Jun. 26, 2012, the entirety of which is incorporated by reference herein.

TECHNICAL FIELD

The technical field relates to a liquid crystal formulation, and in particular, relates to a polymer-stabilized optical isotropic liquid crystal formulation.

BACKGROUND

Isotropic liquid crystals or optical isotropic liquid crystals refer to the liquid crystals having a birefringence of zero when no electric field is applied thereto; for example, blue phase (BP) liquid crystals or isotropic phase (cleaning phase) liquid crystals (which have a higher temperature than the blue phase liquid crystals). The blue phase is a liquid crystal phase which exists within a narrow range of temperature (in 1° C. to 2° C.) between the temperature of cholesteric phase (CH) and isotropic phase. Therefore, applications of the blue phase liquid crystals are very limited. However, when 5 wt % to 20 wt % of polymers are added into the blue phase liquid crystals, the resulting liquid crystals can have a wider range of temperature, and are called polymer-stabilized blue phase liquid crystals (PSBPLC). This polymer-stabilizing method can also be used with isotropic phase liquid crystals, and are called polymer-stabilized isotropic phase liquid crystals (PSIPLC).

The blue phase liquid crystals and isotropic liquid crystals are optical isotropic when no electric field is applied thereto. Therefore, they do not need to be orientated like the traditional nematic liquid crystals. Optical isotropic material may be transformed to be anisotropic by an electric field. In other words, the birefringence ($\Delta n$) can be induced by an electric field. In addition, they have fast response time of less than 1 ms and a high contrast ratio. Thus, the orientation layer may not be required. Therefore, blue phase liquid crystals and isotropic liquid crystals become an emerging display technology.

However, although the workable temperature of the blue phase liquid crystals or the isotropic liquid crystal can be broadened by the polymer-stabilized technique, the displays still surfer from problems related to the operating voltage and hysteresis.

Therefore, optical isotropic liquid crystals with a lower operating voltage and less hysteresis are desired.

SUMMARY

An embodiment provides a polymer-stabilized optical isotropic liquid crystal formulation, including 50 to 99.5 parts by weight of an optical isotropic liquid crystal material; and 0.5 to 50 parts by weight of polymer, wherein the polymer is polymerized by an acrylic monomer containing fluorine groups and an acrylic monomer with a liquid crystal phase and/or an acrylic monomer without a liquid crystal phase.

An embodiment provides an optical isotropic liquid crystal device, including a pair of substrates and the polymer-stabilized optical isotropic liquid crystal formulation described previously, located between the pair of the substrates, wherein at least one of the pair of the substrates is a transparent substrate.

A detailed description is given in the following embodiments with reference to the accompanying drawings.

DESCRIPTION OF THE DRAWINGS

The present disclosure can be more fully understood by reading the subsequent detailed description and examples with references made to the accompanying drawings, wherein.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

In one embodiment, a polymer-stabilized optical isotropic liquid crystal formulation is provided. The polymer-stabilized optical isotropic liquid crystal formulation comprises: about 50 to 99.5 parts by weight or about 75 to 95 parts by weight of an optical isotropic liquid crystal material; and about 0.5 to 50 parts by weight or 1 to 30 parts by weight of polymer. In one embodiment, the polymers are polymerized by at least about 10 to 90 parts by weight or about 15 to 65 parts by weight of an acrylic monomer with a liquid crystal phase and/or an acrylic monomer without a liquid crystal phase and about 1 to 90 parts by weight or about 15 to 35 parts by weight of an acrylic monomer containing fluorine groups.

In another embodiment, the polymer is polymerized by about 35 to 65 parts by weight of the acrylic monomer with a liquid crystal phase, about 15 to 35 parts by weight of the acrylic monomer without a liquid crystal phase, and about 15 to 35 parts by weight of the acrylic monomer containing fluorine groups.

In still another embodiment, the polymer forms a polymer network (in three dimensions).

In one embodiment, the optical isotropic liquid crystal material is a blue phase liquid crystal material or an isotropic phase (cleaning phase) liquid crystal material. In another embodiment, the optical isotropic liquid crystal material has a birefringence ($\Delta n$) of between about 0.05 and 0.5 and a dielectric anisotropy ($\Delta \varepsilon$) of between about 3 and 250.

In another embodiment, the optical isotropic liquid crystal material may be a liquid crystal molecule or a combination of liquid crystal molecules. In another embodiment, the optical isotropic liquid crystal material comprises a liquid crystal molecule and a chiral compound. The liquid crystal molecule may be a molecule with a single mesogenic core or a multi mesogenic core in a nematic phase, a smectic phase, or a cholesteric phase. For example, the liquid crystal molecule may comprise rod-like liquid crystals, non-rod-like liquid crystals, or combinations thereof, wherein the non-rod-like liquid crystals comprise bent-shape liquid crystals, T-shape liquid crystals, U-shape liquid crystals, λ-shape liquid crystals, disc-like liquid crystals, columnar liquid crystals, or combinations thereof.

When the optical isotropic liquid crystal material comprises a liquid crystal molecule and a chiral compound, a weight ratio of the liquid crystal molecule to the chiral compound is between about 100:1 and 100:30 or between about 100:2 and 100:10. The chiral compound may be a chiral nematic compound, such as a compound with an optionally substituted biphenyl or -Ar-B-Ar- structure, wherein Ar is optionally substituted aryl group and B is a linking group. Examples for the linking group include, but, are not limited to, the carbonyl group (—C(O)—), ester group (—C(O)O—), carbonate ester group (—OC(O)O—), amide group (—C(O)NH—), azo group (—N=N—), methylene group (—CH$_2$—), ethylene group (—C$_2$H$_4$—), vinylene group (—CH=CH—), ethynylene group (—C≡C—), oxygen (—O—), sulfur (—S—), or the like. Other examples of the chiral compound may be the chiral compounds listed in U.S. Pat. No. 7,623,214 (columns 5 to 6), wherein their helical twisting power (HTP) may be between about 20 μm$^{-1}$ and about 200 μm$^{-1}$ or higher.

In one embodiment, the acrylic monomer with a liquid crystal phase comprises mono-acrylic monomer with a liquid crystal phase, bi-acrylic monomer with a liquid crystal phase, multi-acrylic monomer with a liquid crystal phase, or combinations thereof.

In another embodiment, the acrylic monomer with a liquid crystal phase has the following formula: R—S-M-P or R—S-M-S—R, wherein R is a functional group that can be polymerized, such as a functional group containing the methacrylic group or acrylic group. S is a soft bonding (not rigid bonding), such as a single bond, —(CH$_2$)$_m$-(m is an integer between 1 to 12), or —O(CH$_2$)$_n$— (n is an integer between 1 to 12). P is C$_1$ to C$_{12}$ alkyl group, C$_1$ to C$_{12}$ alkoxy group, or cyano group. -M- is a liquid crystal core and may have the following formula:

wherein, L is a single bond or a divalent linking group (such as —COO—, —CH$_2$O—, —CONH—, or —C=N—). X is —H, —CH$_3$, or —F. B is substituted or non-substituted divalent linking group, wherein the divalent linking group comprises a divalent arylene group, a divalent cycloalkylene group, or a divalent linking group formed by a combination of the divalent arylene group and/or the divalent cycloalkylene group. For the divalent linking group formed by a combination of the divalent arylene group and/or the divalent cycloalkylene group, each ring is connected by a single bond or a linking group. In addition, the divalent arylene group and divalent cycloalkylene group may have hetrocyclic rings or carbon rings. In one embodiment, the divalent arylene group is biphenylene group, and the divalent cycloalkylene group is cyclohexene group.

Examples of the acrylic monomer with a liquid crystal phase may include, but, are not limited to, the following compounds:

or combinations thereof, wherein each in is an integer independently selected from 1 to 12, and X is —H, —CH$_3$, or —F.

Examples of the acrylic monomer without a liquid crystal phase include, but, are not limited to, mono-acrylic monomer without a liquid crystal phase, bi-acrylic monomer without a liquid crystal phase, multi-acrylic monomer without a liquid crystal phase, or combinations thereof. Examples of the mono-acrylic monomer without a liquid crystal phase include, but, are not limited to, ethyl acrylate, n-butyl acrylate, t-butyl acrylate, n-hexyl acrylate, n-octyl acrylate, dodecyl acrylate, 2-ethylhexyl acrylate, 3,5,5-trimethylhexyl acrylate, or combinations thereof. The bi-acrylic monomer without a liquid crystal phase comprises 1,3-butanediol diacrylate, ethylene diacrylate, or combinations thereof, and the multi-acrylic monomer without a liquid crystal phase comprises trimethylolpropanetriacrylate (TMPTA).

Examples of the acrylic monomer containing fluorine groups include, but, are not limited to, methacrylate compounds containing fluorine groups, acrylate compounds containing fluorine groups, or combinations thereof. For example, the acrylic monomer containing fluorine groups comprises 2,2,2-trifluoroethyl methacrylate, 2,2,2-trifluoroethyl acrylate, 2,2,3,3-tetrafluoropropyl methacrylate, 2,2,3,3-tetrafluoropropyl acrylate, 2,2,3,3,3-pentafluoropropyl acrylate, 2,2,3,3,3-pentafluoropropyl methacrylate, 1,1,1,3,3,3-hexafluoroisopropyl acrylate, 1H-1-(trifluoromethyl) trifluoroethyl methacrylate, 2,2,3,4,4,4-hexafluorobutyl methacrylate, 2,2,3,4,4,4-hexafluorobutyl acrylate, 1H,1H-heptafluorobutyl methacrylate, 1H,1H-heptafluorobutyl acrylate, 1H,1H,5H-octafluoropentyl methacrylate, 1H,1H,5H-octafluoropentyl acrylate, 1H,1H,7H-dodecafluoroheptyl acrylate, 2-(perfluorohexyl)ethyl acrylate, 2-(perfluorohexyl) ethyl methacrylate, 2-(perfluorooctyl)ethyl methacrylate, 2-(perfluoro-7-methyloctyl) ethyl methacrylate, 2-(perfluoro-9-methyloctyl)ethyl acrylate, 2-(Perfluorodecyl) ethyl acrylate, 2-(perfluorodecyl)ethyl methacrylate, or combinations thereof.

The polymer network may be polymerized by, for example, radical polymerization, anionic polymerization, cationic polymerization, ring-opening polymerization, group transfer polymerization, or any other polymerization method used in the art. The polymerization may be initiated by heat or light. Therefore, 0.5 to 3 parts by weight of a photo initiator may be further used in the polymerization process. In one embodiment, the photo initiator includes hydroxyketone (such as IRGACURE 184, DAROCUR 1173, and IRGACURE 2959), phenylglyoxylate (such as DAROCUR MBF and IRGACURE 754), benzyldimethyl-ketal compound (such as IRGACURE 651), aminoketone (such as IRGACURE 369 and IRGACURE 907), monoacyl diphenyl compound (such as DAROCUR TPO), bisacyl phosphine (such as IRGACURE 819), phosphine oxide (such as IRGACURE 2100), iodonium salt (such as IRGACURE 250), metallocene (such as IRGACURE 784), or combinations thereof.

In one embodiment, the polymer-stabilized optical isotropic liquid crystal formulation may not include the acrylic monomer without a liquid crystal phase, or the polymer-stabilized optical isotropic liquid crystal formulation may include both the acrylic monomer without a liquid crystal phase and the acrylic monomer with a liquid crystal phase, or the polymer-stabilized optical isotropic liquid crystal formulation may not include the acrylic monomer with a liquid crystal phase. The use of the acrylic monomer without a liquid crystal phase may broaden the range of the operation temperature. The use of the acrylic monomer with a liquid crystal phase may increase the compatibility between the acrylic monomer without a liquid crystal phase and the optical isotropic liquid crystal material in the polymer-stabilized optical isotropic liquid crystal formulation. In addition, in other embodiments, the polymer network may also include a small amount of transparent oligomer or polymer, such as epoxy, cellulose, polypropylene, polyethylene, polyvinylidene fluoride (PVDF), or combinations thereof.

Figure 1A:
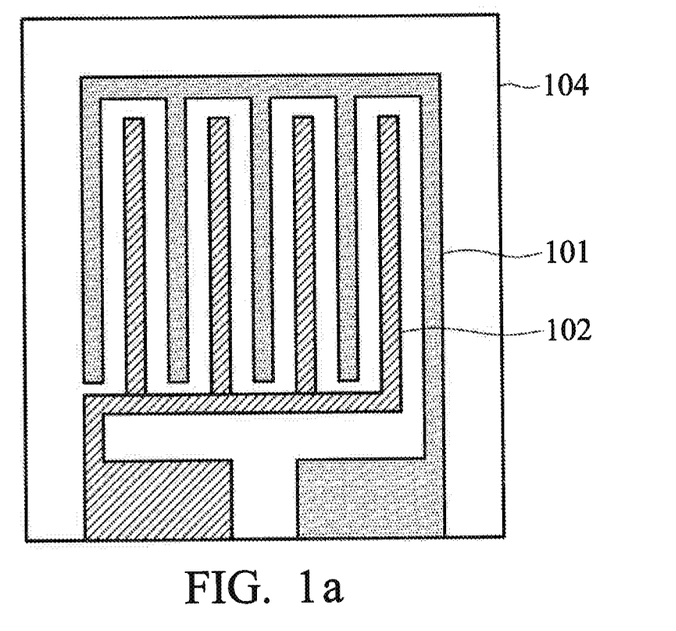
FIG. 1a illustrates a top view diagram of an optical isotropic liquid crystal device 100 according to one embodiment.
Figure 1B:
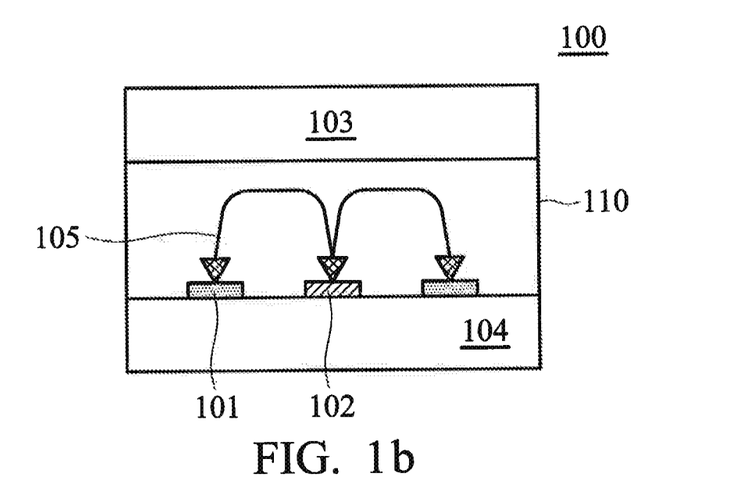
FIG. 1b illustrates a cross section diagram of the optical isotropic liquid crystal device 100 according to one embodiment.

FIG. 1a illustrates a top view diagram of an optical isotropic liquid crystal device 100 and FIG. 1b illustrates a cross section diagram of the optical isotropic liquid crystal device 100 according to one embodiment. The optical isotropic liquid crystal device 100 comprises a pair of substrates (103 and 104) and the polymer-stabilized optical isotropic liquid crystal formulation as described previously, located between the pair of the substrates, wherein at least one of the pair of the substrates is a transparent substrate. The substrates (103 and 104) may be a rigid substrate or a flexible substrate. Examples of a rigid substrate include, but, are not limited to, a glass substrate, a ceramic substrate, a silicon substrate, or combinations thereof. A flexible substrate may be, but, is not limited to, a plastic substrate, such as a polyethersulfone (PES) substrate, a polyethylene naphthalate (PEN) substrate, a polyethylene (PE) substrate, a polyimide (PI) substrate, a polyvinyl chloride (PVC) substrate, a polyethylene terephthalate (PET) substrate, or combinations thereof.

In one embodiment, the optical isotropic liquid crystal device 100 may be an in-plane switching (IPS) device. In the embodiment, a pixel electrode 101 and a counter electrode 102 are disposed on the substrate 104, wherein at least a portion of the pixel electrode and at least a portion of the counter electrode are inter-digitized parallel bars and are staggered from each other, as shown in FIG. 1a. A cell gap between the two substrates may be between about 1 μm to about 20 μm, or may be between about 2 μm to about 8 μm. A distance between the pixel electrode and the counter electrode may be between about 1 μm to about 10 μm. As described previously, the optical isotropic liquid crystal formulation can be used without using an orientation layer.

Liquid crystal molecules 110 in the optical isotropic liquid crystal device may be a blue phase liquid crystal material or an isotropic phase liquid crystal material. The liquid crystal molecules are located between two substrates. A spacer may be used between the two substrates to adjust the cell gap between the two substrates. When an electric field 105 is applied across the electrodes, the three dimensional structure of the optical isotropic liquid crystals may be altered and induce birefringence. In one embodiment, for the optical isotropic liquid crystal 110, the optical isotropic liquid crystal formulation is polymer-stabilized by the polymer network of the acrylic monomer containing fluorine groups. Therefore, the operation voltage may be decreased and occurrence of hysteresis may be diminished, such that almost no hysteresis appears in the optical isotropic liquid crystal device 100 (half height is of about 1V, or even 0V). Furthermore, the optical isotropic liquid crystal formulation may also be used on a flexible substrate and have a pattern to provide physical support to the substrate for protection against pressure from external sources and mechanical impact.

Examples for the optical isotropic liquid crystal device include, but, are not limited to, optical displays, phase modulators, beam steering devices, sensors, laser devices, or the like, and the optical isotropic liquid crystal device may be manufactured by any appropriate method.

The optical isotropic liquid crystal device may be applied to various electric devices, such as mobile phones, digital cameras, PDA, laptops, personal computers, televisions, DVD players, electric books, or the like.

EXAMPLE 1

1. Blue Phase Liquid Crystal Formulation (Blue Phase Temperature Ranges from 56° C. to 63° C.)

(1) 95.7 wt % of a liquid crystal formulation with high dielectric anisotropy, JM 2069-145, wherein the JM 2069-145 had the following physical properties: birefringence $\Delta n=0.215$ (at wavelength $\lambda=633$ nm); dielectric anisotropic $\Delta\varepsilon=50$ (at 1 kHz and at 21° C.); and clearing temperature Tc=80° C. (Refer to Y. Chen, J. Yan, J. Sun, S. T. Wu, X. Liang, S. H. Liu, P. J. Hsieh, K. L. Cheng, and J. W. Shiu, "A microsecond-response polymer-stabilized blue phase liquid crystal," Appl. Phys. Lett. 99, 201105 (Nov. 15, 2011)); and

(2) 4.3 wt % of R5011 (a chiral compound; bought from Merck).

2. Monomer Formulation 3FMM1

(1) 24.5 wt % of 2,2,2-trifluoroethyl methacrylate (which was an acrylic monomer containing fluorine groups; 3FMA; bought from F-Tech), wherein the 2,2,2-trifluoroethyl methacrylate had the following formula:

(2) 24.5 wt % of trimethylolpropanetriacrylate (which is tri-acrylic monomer without a liquid crystal phase; TMPTA; bought from Aldrich), wherein the trimethylolpropanetriacrylate had the following formula:

and (3) 49 wt % of 1,4-Bis-[4-(3-acryloyloxypropyloxy)benzoyloxy]-2-methylbenzene (which was a reactive bi-acrylic monomer with a liquid crystal phase; RM257; bought from Merck), the RM257 had the following formula:

and (4) 2 wt % of 2-hydroxy-4'(2-hydroxyethoxy)-2-methylpropiophenone (which was a photo initiator; Irgacure 651; bought from ciba).

3. Preparation of the Polymer-Stabilized Formulation and Manufacturing the Device Preparation of the Formulation:
90 wt % of blue phase liquid crystals and 10 wt 3FMM1
Manufacturing the Device:
Cell: bought from Instec Inc. (in-plane switching cell, without polyimide orientation layer; line/spec=10 μm/10 μm; cell gap=7.5 μm)

The prepared formulation was filled into the cell and exposed to light at 50° C. for 10 minutes. A voltage was applied to the device at 200 Hz from 0V to 70V (wherein the voltage increased 0.1V each time), and then the voltage was decreased from 70V to 0V (wherein the voltage decreased 0.1V each time). The relationship between the transparency and the voltage was recorded and compared.

Figure 2:
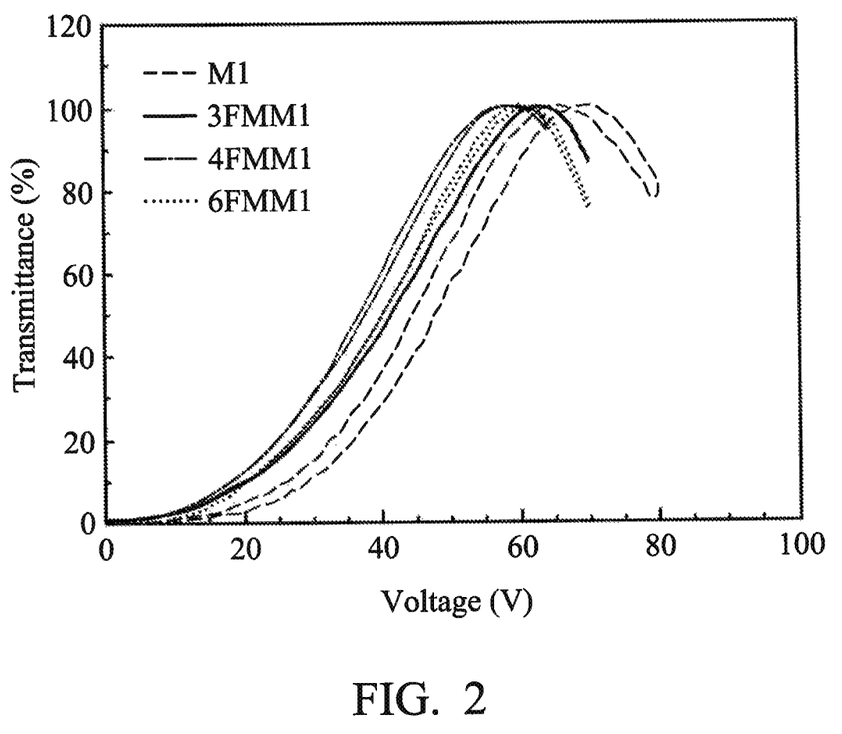
FIG. 2 illustrates the operation voltage of the optical devices in the examples.

As shown in FIG. 2, the operation voltage, of the resulting optical device in Example 1 was 62V, and the hysteresis (half height) was 0V.

EXAMPLE 2

1. Blue Phase Liquid Crystal Formulation

The blue phase liquid crystal formulation in this Example was the same as that of the Example 1.

2. Monomer Formulation 4FMM1

(1) 24.5 wt % of 2,2,3,3-tetrafluoropropyl methacrylate (which was an acrylic monomer containing fluorine groups; bought from Aldrich), wherein the 2,2,3,3-tetrafluoropropyl methacrylate had the following formula:

(2) 24.5 wt % of trimethylolpropanetriacrylate (which is tri-acrylic monomer without a liquid crystal phase; TMPTA; bought from Aldrich); and (3) 49 wt % of 1,4-Bis-[4-(3-acryloyloxypropyloxy)benzoyloxy]-2-methylbenzene (which was a reactive bi-acrylic monomer with a liquid crystal phase; RM257; bought from Merck); and (4) 2 wt % of 2-hydroxy-4'(2-hydroxyethoxy)-2-methyl-propiophenone (which was a photo initiator; Irgacure 651; bought from ciba).

3. Preparation of the Polymer-Stabilized Formulation and Manufacturing the Device Preparation of the Formulation:
90 wt % of blue phase liquid crystals and 10 wt % of 4FMM1
Manufacturing the Device:
Cell: bought from Instec Inc. (in-plane switching cell, without polyimide orientation layer; line/spec=10 μm/10 μm; cell gap=7.5 μm)
The prepared formulation was filled into the cell and exposed to light at 48° C. for 10 minutes. A voltage was applied to the device at 200 Hz from 0V to 70V (wherein the voltage increased 0.1V each time), and then the voltage was decreased from 70V to 0V (wherein the voltage decreased 0.1V each time). The relationship between the transparency the voltage was recorded and compared.

As shown in FIG. 2, the operation voltage of the resulting optical device in Example 2 was 59V, and the hysteresis (half height) was 0.8V.

EXAMPLE 3

1. Blue Phase Liquid Crystal Formulation

The blue phase liquid crystal formulation in this Example was the same as that of the Example 1.

2. Monomer Formulation 6FMM1

(1) 24.5 wt % of 1H-1-(trifluoromethyl)trifluoroethyl methacrylate (which was an acrylic monomer containing fluorine groups; bought from Aldrich), wherein the 1H-1-(trifluoromethyl)trifluoroethyl methacrylate had the following formula:

(2) 24.5 wt % of trimethylolpropanetriacrylate (which is tri-acrylic without a liquid crystal phase; TMPTA; bought from Aldrich); and (3) 49 wt % of 1,4-Bis-[4-(3-acryloyloxypropyloxy)benzoyloxy]-2-methylbenzene (which was a reactive bi-acrylic monomer with a liquid crystal phase; RM257; bought from Merck); and (4) 2 wt % of 2-hydroxy-4-(2-hydroxyethoxy)-2-methyl-propiophenone (which was a photo initiator; Irgacure 651; bought from ciba).

3. Preparation of the Polymer-Stabilized Formulation and Manufacturing the Device Preparation of the Formulation:
90 wt % of blue phase liquid crystals and 10 wt % of 6FMM1
Manufacturing the Device:
Cell: bought from Instec Inc. (in-plane switching cell, without polyimide orientation layer; line/spec=10 μm/10 μm; cell gap=7.5 μm)
The prepared formulation was filled into the cell and exposed to light at 49° C. for 10 minutes. A voltage was applied to the device at 200 Hz from 0V to 70V (wherein the voltage increased 0.1V each time), and then the voltage was decreased from 70V to 0V (wherein the voltage decreased 0.1V each time). The relationship between the transparency and the voltage was recorded and compared.

As shown in FIG. 2, the operation voltage of the resulting optical device in Example 3 was 60V, and the hysteresis (half height) was 0.5V.

Comparative Example 1

1. Blue Phase Liquid Crystal Formulation

The blue phase liquid crystal formulation in this Example was the same as that of the Example 1.

2. Monomer Formulation M1

(1) 49 wt % of trimethylolpropanetriacrylate (which is tri-acrylic monomer without a liquid crystal phase; TMPTA; bought from Aldrich), the rimethylolpropanetriacrylate had the following formula:

(2) 49 wt % of 1,4-Bis-[4-3-acryloyloxypropyloxy)benzoyloxy]-2-methylbenzene (which was a reactive bi-acrylic monomer with a liquid crystal phase; RM257; bought from Merck), the 1,4-Bis-[4-(3-acryloyloxypropyloxy)benzoyloxy]-2-methylbenzene had the following formula:

and (3) 2 wt % of 2-hydroxy-4'-(2-hydroxyethoxy)-2-methylpropiophenone (which was a photo initiator; Irgacure 651; bought from ciba).

3. Preparation of the Polymer-Stabilized Formulation and Manufacturing the Device Preparation of the Formulation:
90 wt % of blue phase liquid crystals and 10 wt % of M1
Manufacturing the Device:
Cell: bought from Instec Inc. (in-plane switching cell, without polyimide orientation layer; line/spec=10 μm/10 μm; cell gap=7.5 μm)

The prepared formulation was filled into the cell and exposed to light at 43° C. for 10 minutes. A voltage was applied to the device at 200 Hz from 0V to 70V (wherein the voltage increased 0.1V each time), and then the voltage was decreased from 70V to 0V (wherein the voltage decreased 0.1V each time). The relationship between the transparency and the voltage was recorded and compared.

As shown in FIG. 2, the operation voltage of the resulting optical device in comparative Example 1 was 68V, and the hysteresis (half height) was 3.5V.

TABLE 1

|  | Comparative Example 1 (M1) | Example 1 (3FMM1) | Example 2 (4FMM1) | Example 3 (6FMM1) |
|---|---|---|---|---|
| Hysteresis (□V) | 3.5 V | 0 V | 0.8 V | 0.5 V |
| Operation Voltage (Vpeak) | 68 V | 62 V | 57 V | 60 V |

As shown in Table 1 and FIG. 2, the polymer network formed by using the acrylic monomer containing fluorine groups in the examples had lower operation voltages and less hysteresis.

In Examples 1 to 3, the operation temperatures of the polymer-stabilized optical isotropic liquid crystal formulation were between about 20° C. and 63° C. Therefore, the operation temperatures of the optical isotropic liquid crystal device had a wider range.

These examples showed that the operation voltage and hysteresis of the polymer-stabilized optical isotropic liquid crystal formulation were improved. By using the polymer network containing at least one of the acrylic monomer containing fluorine groups, the optical isotropic liquid crystal formulation may be stabilized, and the operation voltage may be decreased. In addition, less hysteresis would likely occur.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A polymer-stabilized optical isotropic liquid crystal formulation, comprising:
    50 to 99.5 parts by weight of an optical isotropic liquid crystal material, wherein the optical isotropic liquid crystal material is a blue phase liquid crystal material; and
    0.5 to 50 parts by weight of polymer, wherein the polymer is polymerized by an acrylic monomer containing fluorine groups and an acrylic monomer with a liquid crystal phase and/or an acrylic monomer without a liquid crystal phase.

2. The polymer-stabilized optical isotropic liquid crystal formulation as claimed in claim 1, wherein the polymer is polymerized by:
    1 to 90 parts by weight of the acrylic monomer containing fluorine groups; and
    10 to 90 parts by weight of the acrylic monomer with a liquid crystal phase and/or the acrylic monomer without a liquid crystal phase.

3. The polymer-stabilized optical isotropic liquid crystal formulation as claimed in claim 1, wherein the acrylic monomer containing fluorine groups comprises methacrylate compounds containing fluorine groups, acrylate compounds containing fluorine groups, or combinations thereof.

4. The polymer-stabilized optical isotropic liquid crystal formulation as claimed in claim 1, wherein the acrylic monomer containing fluorine groups comprises 2,2,2-trifluoroethyl methacrylate, 2,2,2-trifluoroethyl acrylate, 2,2,3,3-tetrafluoropropyl methacrylate, 2,2,3,3-tetrafluoropropyl acrylate, 2,2,3,3,3-pentafluoropropyl acrylate, 2,2,3,3,3-pentafluoropropyl methacrylate, 1,1,1,3,3,3-hexafluoroisopropyl acrylate, 1H-1-(trifluoromethyl) trifluoroethyl methacrylate, 2,2,3,4,4,4-hexafluorobutyl methacrylate, 2,2,3,4,4,4-hexafluorobutyl acrylate, 1H,1H-heptafluorobutyl methacrylate, 1H,1H-heptafluorobutyl acrylate, 1H,1H,5H-octafluoropentyl methacrylate, 1H,1H,5H-octafluoropentyl acrylate, 1H,1H,7H-dodecafluoroheptyl acrylate, 2-(perfluorohexyl) ethyl acrylate, 2-(perfluorohexyl) ethyl methacrylate, 2-(perfluorooctyl) ethyl methacrylate, 2-(perfluoro-7-methyloctyl) ethyl methacrylate, 2-(perfluoro-9-methyloctyl) ethyl acrylate, 2-(Perfluorodecyl) ethyl acrylate, 2-(perfluorodecyl) ethyl methacrylate, or combinations thereof.

5. The polymer-stabilized optical isotropic liquid crystal formulation as claimed in claim 1, wherein the acrylic monomer without a liquid crystal phase comprises mono-acrylic monomer without a liquid crystal phase, bi-acrylic monomer without a liquid crystal phase, multi-acrylic monomer without a liquid crystal phase, or combinations thereof.

6. The polymer-stabilized optical isotropic liquid crystal formulation as claimed in claim 5, wherein the mono-acrylic monomer without a liquid crystal phase comprises ethyl acrylate, n-butyl acrylate, t-butyl acrylate, n-hexyl acrylate, n-octyl acrylate, dodecyl acrylate, 2-ethylhexyl acrylate, 3,5,5-trimethylhexyl acrylate, or combinations thereof; the bi-acrylic monomer without a liquid crystal phase comprises 1,3-butanediol diacrylate, ethylene diacrylate, or combinations thereof; and the multi-acrylic monomer without a liquid crystal phase comprises trimethylolpropanetriacrylate (TMPTA).

7. The polymer-stabilized optical isotropic liquid crystal formulation as claimed in claim 1, wherein the acrylic monomer with a liquid crystal phase comprises mono-acrylic monomer with a liquid crystal phase, bi-acrylic monomer with a liquid crystal phase, multi-acrylic monomer with a liquid crystal phase, or combinations thereof.

8. The polymer-stabilized optical isotropic liquid crystal formulation as claimed in claim 1, wherein the acrylic monomer with a liquid crystal phase has the following formula:

R—S-M-P or R—S-M-S—R, wherein R is a functional group containing methacrylate group or acrylate group;

S is a soft bond;

P is $C_1$ to $C_{12}$ alkyl group, $C_1$ to $C_{12}$ alkoxy group, or cyano group; and M has the following formula:

wherein L is a single bond, —COO—, —CH$_2$O—, —CONH—, or —C=N—;

X is —H, or —CH;

B is substituted or non-substituted divalent linking group, wherein the divalent linking group comprises a divalent arylene group, divalent cycloalkylene group, or a divalent linking group formed by a combination of the divalent arylene group and/or the divalent cycloalkylene group, wherein in the divalent linking group formed by a combination of the divalent arylene group and/or the divalent cycloalkylene group, each ring is connected by a single bond or a linking group, wherein the divalent arylene group and divalent cycloalkylene group are hetrocyclic rings or carbon rings.

9. The polymer-stabilized optical isotropic liquid crystal formulation as claimed in claim 8, wherein the soft bond comprises a single bond, —(CH$_2$)$_m$-(m is an integer between 1 to 12), or —O(CH$_2$)$_n$-(n is an integer between 1 to 12).

10. The polymer-stabilized optical isotropic liquid crystal formulation as claimed in claim 7, wherein the mono-acrylic monomer with a liquid crystal phase comprises:

or combinations thereof;

the bi-acrylic monomer with a liquid crystal phase comprises:

-continued

-continued or combinations thereof, wherein each m is an integer independently selected from 1 to 12; and X is —H, or —CH.

11. The polymer-stabilized optical isotropic liquid crystal formulation as claimed in claim 1, wherein the optical isotropic liquid crystal material comprises a liquid crystal molecule and a chiral compound, and a weight ratio of the liquid crystal molecule to the chiral compound is between 100:1 and 100:30.

12. The polymer-stabilized optical isotropic liquid crystal formulation as claimed in claim 1, wherein the optical isotropic liquid crystal material is a blue phase liquid crystal material or an isotropic phase liquid crystal material.

13. The polymer-stabilized optical isotropic liquid crystal formulation as claimed in claim 1, wherein the optical isotropic liquid crystal material has a birefringence (Δn) of between 0.05 and 0.5 and a dielectric anisotropic (ΔE) of between 3 and 250.

14. The polymer-stabilized optical isotropic liquid crystal formulation as claimed in claim 11, wherein the liquid crystal molecule comprises a single mesogenic core or a multi mesogenic core in a nematic phase, a smectic phase, or a cholesteric phase.

15. The polymer-stabilized optical isotropic liquid crystal formulation as claimed in claim 11, wherein the liquid crystal molecule comprises rod-like liquid crystals, non-rod-like liquid crystals, or combinations thereof, and the non-rod-like liquid crystals comprise bent-shape liquid crystals, T-shape liquid crystals, U-shape liquid crystals, λ-shape liquid crystals, disc-like liquid crystals, columnar liquid crystals, or combinations thereof.

16. An optical isotropic liquid crystal device, comprising a pair of substrates and the polymer-stabilized optical isotropic liquid crystal formulation as claimed in claim 1 located between the pair of the substrates, wherein at least one of the pair of the substrates is a transparent substrate.

* * * * *